MONOPHONIC TO STEREOPHONIC SYSTEM CONVERTER

Filed May 9, 1960 3 Sheets-Sheet 1

INVENTOR.
RICHARD S. SVOREC
BY M. A. Hobbs
ATTORNEY

Jan. 3, 1967 R. S. SVOREC 3,296,376

MONOPHONIC TO STEREOPHONIC SYSTEM CONVERTER

Filed May 9, 1960 3 Sheets-Sheet 2

INVENTOR.
RICHARD S. SVOREC
BY M. A. Hobbs
ATTORNEY

INVENTOR.
RICHARD S. SVOREC
BY M. A. Hobbs
ATTORNEY

United States Patent Office 3,296,376
Patented Jan. 3, 1967

3,296,376
MONOPHONIC TO STEREOPHONIC SYSTEM CONVERTER
Richard S. Svorec, 824 36th St., South Bend, Ind. 46635
Filed May 9, 1960, Ser. No. 27,823
5 Claims. (Cl. 179—15)

This invention relates to transmission and reproduction apparatus for audio signals, and more particularly to means utilizing a monophonic amplifier or other single channel for the transmission or reproduction of two stereophonically related signals.

One of the principal objects of the present invention is to provide an apparatus for converting a monophonic radio or television transmitting and receiving system or a monophonic record or tape recording and reproducing system to sterephonoic use which is much simpler in construction and operation than present units for such conversion.

Another object of the invention is to provide a monophonic to stereophonic converter whose components are readily available commercially in a durable and convenient form.

Still another object of the invention is to provide a converter for disc and tape recording and reproduction apparatus which requires only the necessary additional speaker and stereo pickup, in combination with three simple units to be described hereinafter and which requires little or no modification of existing equipment.

A further object of the invention is to provide a converter for television and FM and AM radio transmitters and receivers which requires only microphones and a switching unit in addition to existing monophonic transmitters and an additional speaker and a pair of filtering units at the receiver for conversion to stereophonic sound.

An additional object of the invention is to provide a monophonic to stereophonic conversion apparatus which requires very little power and provides relatively high quality reproduction of the sound without decreasing the stereophonic effect.

In conventional stereophonic systems, two amplifiers are used, each of which must amplify with the same characteristics as the other amplifier. This frequently calls for balancing of the two amplifiers, a job which can be difficult, especially when the two amplifiers are dissimilar. Hence, a further object of the present invention is to provide a converter of the above type which will require no balancing or adjusting of the amplifier.

Modern stereophonic discs cannot be played on a monophonic record player, since the monophonic pickup is frequently thrown out of the groove by large opposing variations of the sides of the groove, resulting in poor sound reproduction and damaged discs and pickups. Thus, one object of the present invention is to provide a means for recording discs and tapes which can be played on existing monophonic reproducing machines without modification of the apparatus, and which will yield as high quality sound as present monophonic discs and tapes.

Another difficulty found in stereophonic sound apparatus is the "hole-in-the-middle" effect, in which the sound from the two speakers appears to come only from the vicinity of the speakers, thus sounding like two point sources of sound rather than the desired effect of sound from the whole space between the speakers as well as from the speakers themselves. One common solution to this problem is to place a third speaker between the first two speakers and let it reproduce both channels. Further, there is a more difficult and hence less common but more effective solution, consisting in partial mixing or blending of the two stereophonic channels so that part of the signal to one speaker goes to the other speaker, and vice versa, in an amount which is just enough to remove the "hole-in-the-middle" without destroying the stereo effect.

Hence, still another object of the present invention is to provide a stereo conversion system in which, with only a slight modification of the original monophonic system, a blending of the two stereophonic signals can be produced in an easily adjusted amount ranging continuously from complete separation to complete combination of the signals.

Additional objects and advantages will become apparent from the following description and accompanying drawings, wherein.

Figure 1:
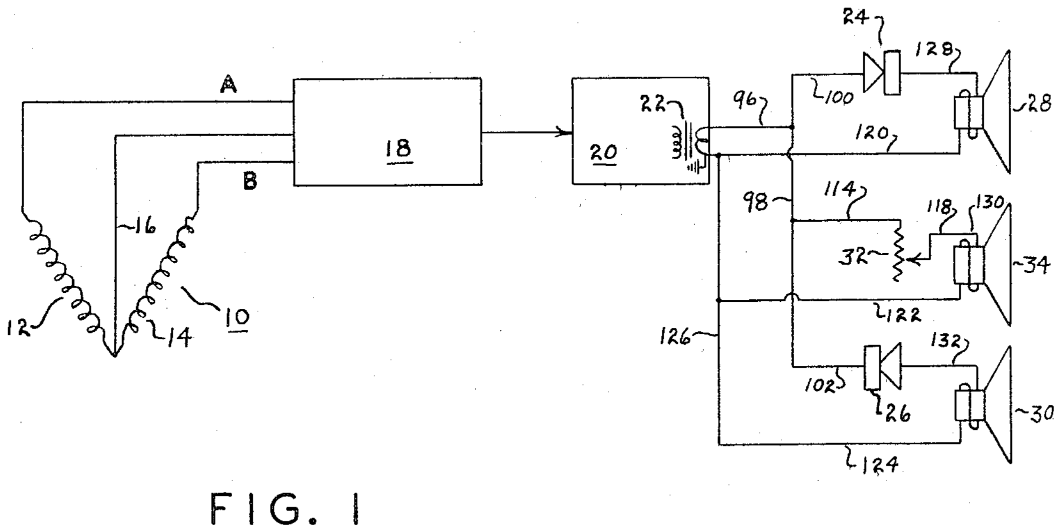
FIGURE 1 is a block diagrammatic view of a disc reproduction system modified for stereophonic use by the present invention.

Referring more specifically to the drawings and to FIGURE 1 in particular, numeral 10 designates a conventional stereophonic pickup for phonograph discs, with left channel 12, right channel 14, and ground 16. The signals from pickup 10 are conducted to switcher 18 and combined there and are then led to amplifier 20 to be monophonically amplified. Leaving the amplifier at 22, the signal is filtered by diodes 24 and 26 and actuates speakers 28 and 30. If desired, the signal may also be left unchanged except for necessary reduction at attenuating device 32 to actuate third speaker 34, which is used to prevent the "hole-in-the-middle" effect.

I designate here the signal from left channel 12, signal A, and that from right channel 14, signal B. In the switcher 18, the signals applied to the inputs 36 and 38 may be attenuated to a suitable level by potentiometers 40 and 42. They are then fed to the grids of switching tube 44, signal A going to grid 46 of tube portion **44*a* and signal B going to grid 48 of tube portion 44*b***.

Within switcher 18, circuit 50 within tube 52 generates square waves or pulses at a fixed number of cycles per second, the number being determined by the size of capacitor 54. Each cycle is represented by one pulse from tube portion **52*a* and an immediately following pulse from portion 52*b*. These actuate driver tube 56, the pulse from 52*a*, applied to grid 58 of driver tube portion 56*a*, rendering portion 56*a* nonconducting. This renders tube portion 44*a* nonconducting also, since the cathodes 60 and 62 of tubes 44*a* and 56*a* are connected, as are cathodes 64 and 66 of portions 44*b* and 56*b*. Since 44*a* is nonconducting, signal A is cut off. At the same time generator tube portion 52*b* is nonconducting, thus rendering driver tube portion 56*b* and hence switching tube portion 44*b* conducting. Hence, signal B is allowed to modulate the current from switching tube 44*b* and is sent out through plate 67 along wire 68 to common wire 70 and thence out through capacitor 72 to terminal 74**.

During the other half of the cycle the operation is reversed, switching tube portion 44*b* being rendered nonconducting and portion 44*a* allowing signal A to modulate the current and leave the tube through plate 75 along wire 76 to common lead 70 through capacitor 72 to terminal 74. The particular switching mechanism employed is not important to this invention, as long as the mechanism can switch between A and B rapidly enough. However, an important feature in this invention is that resistors 78 and 80 have different values, the difference being great enough that no matter what signal strength or frequencies are contained in signals A and B the current of one will always be positive and the other always negative. In other words, in lead 82 and capacitor 72, left to right being positive, the current from tube portion 44*a* will always be flowing from left to right, with the modifications of signal A only increasing and decreasing this flow, never reducing it to nothing or reversing it, while during the pulse from portion 44*b*, the current will flow only from right to left. Thus, referring to FIGURE 4, neither signal A nor signal B will ever touch or cross line 84.

The combined switched signal from terminal 74 is conducted to amplifier 20, preamplified in stage 86, amplified in stage 88, and released through output transformer 22 to terminals 92 and 94. The entire amplification process is monophonic, the amplifier being any conventional high fiidelity amplifier. It would also be possible to use a television transmitter, radio FM or AM transmitter, or disc or tape recorder at this point, signals A and B being from a pair of microphones, a phonograph or tape pickup, or any combination of sources. The invention is not limited in this respect in any way, but can be used in any monophonic apparatus. Furthermore, two of the switching units can be used to record or transmit four separate sources on conventional stereophonic equipment.

The amplified signal, received and amplified by a television or radio receiver or taken directly from the amplifier 20 passes along lead 96 to lead 98 and thence to leads 100 and 102. In lead 100 is diode 24 which will only conduct from left to right in FIGURE 1, and in lead 102 is diode 26, conducting only from right to left. Since signal A only runs from left to right, it is passed by diode 24, but not by diode 26, while signal B, running from right to left, is passed only by diode 26. Thus, signal A is reproduced only by speaker 28 and signal B is reproduced only by speaker 30, thus reproducing the original stereophonic effect. The switching frequency is to be chosen at a high enough rate, for example 45,000 cycles per second, that the sound that it produces will be inaudible. Thus, only the original sound from channel 12, represented by signal A, will be reproduced in speaker 28, and only signal B is reproduced by speaker 30, both without distortion. This is possible since the human ear will accept the variations in strength of the high frequency switched waves and blend them into the original sound, without perceiving the inaudible 45,000 (or other) switching tone.

In case there is a "hole-in-the-middle" effect, as sometimes occurs because of poor room acoustics, a poor recording, or the like, a third speaker 34 between speakers 28 and 30 may be added. It is connected to lead 98 by lead 114, attenuating device 32, and lead 118, the current from all three speakers returning along leads 120, 122 and 124 to common ground lead 126. Speaker 34 receives both signals A and B, and attenuating device 32 is used to reduce the level of the combined signal to "fill the hole-in-the-middle" but still preserve the stereophonic effect.

Figure 2:
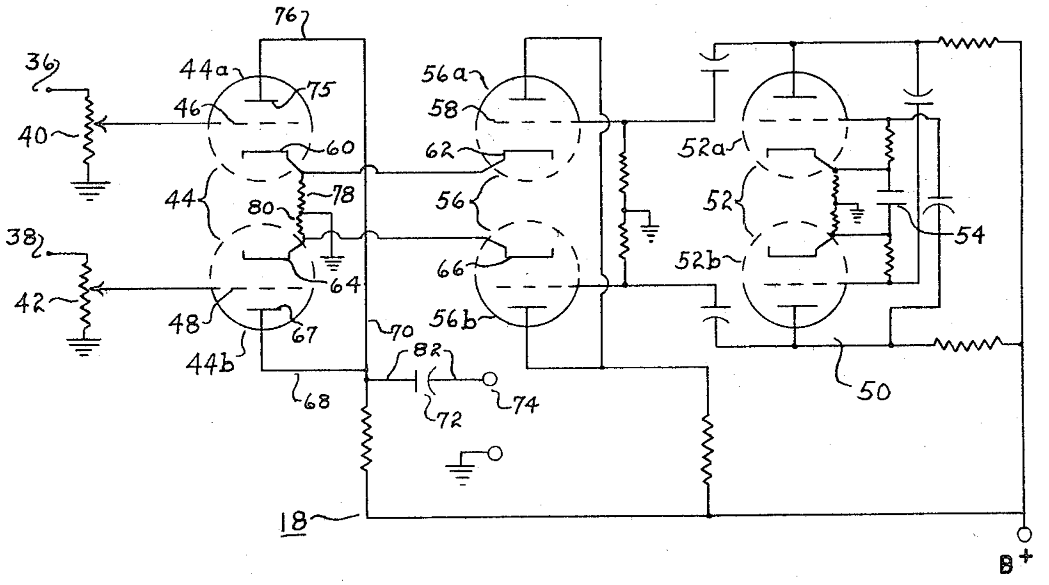
FIGURE 2 is a schematic view of the switching mechanism employed in the present invention.
Figure 3:
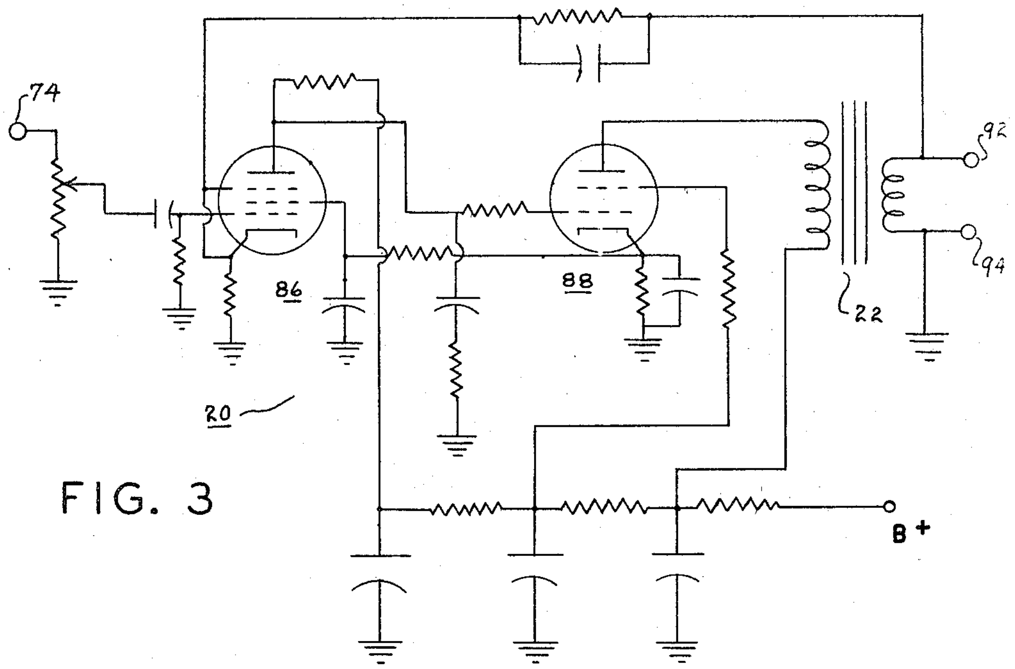
FIGURE 3 is a schematic view of a conventional amplifier which might be used with the present invention.
Figure 4:
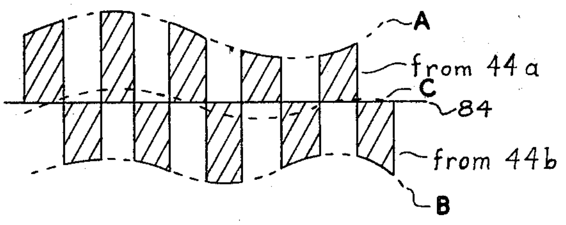
FIGURE 4 is a diagrammatic representation of the signal which is produced in the apparatus of FIGURE 2 and amplified in the apparatus of FIGURE 3.

Referring to FIGURES 2 and 4, it would also be possible to keep the pulses from tube 44*a* and from 44*b* separate, by connecting lead 68 to terminal 74 as before, but changing the connection of lead 76 from terminal 74 to an additional terminal (not shown). In this, lead 76 would have no connection with terminal 74.

This modification of the system might be employed by a recorded disc or tape manufacturer. He would record the two switched signals stereophonically, treating them as if they were not modified from their original form. Then, a person with a stereophonic reproducing machine would play back this disc or tape (probably tape) in the ordinary stereophonic fashion, using no diodes and using the conventional stereto pickup, two amplifiers and speakers. However, a person with a monophonic system could use his monophonic pickup to make both stereo channels into one signal, amplify it monophonically, separate the signal with the diodes, and reproduce the stereo sound, requiring only the diode units and an additional speaker besides his original monophonic equipment.

Figure 8:
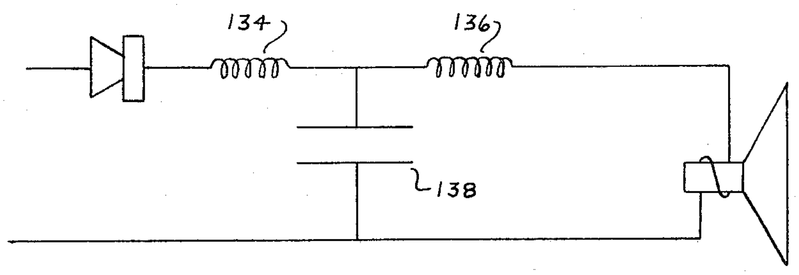
FIGURE 8 is a schematic diagram of a low pass filter used in an alternative connecting method for the speakers.

Although normally the high frequency switching pulse will not affect the speakers, it may be that there will be some distortion with certain model speakers. In that case, low pass filters (FIGURE 8) may be included in lines 128, 130 and 132. These filters will not affect the operation of the diodes, but by the operation of coils 134 and 136 and capacitor 138, will prevent all signals of a predetermined supersonic frequency and above, and particularly of the switching frequency, from entering the speakers. This filter would permit only the frequencies of the audio band (about 20 to 20,000 cycles per second) to enter the speaker, and thus the sound reproduced by the speaker would not be affected by the switching pulses.

Figure 5:
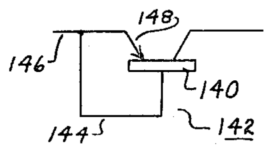
FIGURE 5 is a schematic view of one alternative method of connecting the speakers of a reproducing system employing the present invention.
Figure 6:
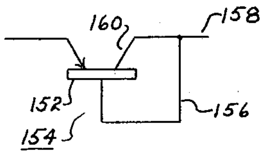
FIGURE 6 is a schematic view of another method of connecting the speakers.
Figure 7:
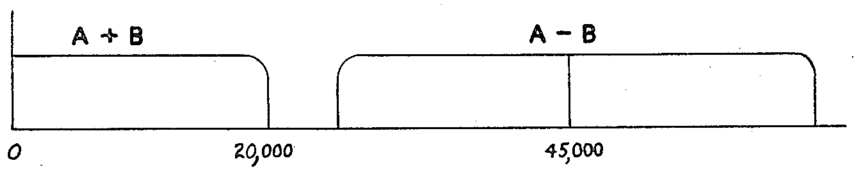
FIGURE 7 shows one possible frequency spectrum diagram of the wave form shown in FIGURE 4.

It may be difficult to find diodes of sufficient current capacity and frequency handling ability as required in the present invention. FIGURES 5 and 6 show two ways a transistor may be modified to perform the job of diodes 24 and 26. In FIGURE 5, the base 140 of transistor 142 is connected by lead 144 to lead 146 of emitter 148. In FIGURE 6, the base 152 of transistor 154 is connected by lead 156 to lead 158 of collector 160. In use, a transistor wired as in FIGURE 5 may be used in place of diode 26, with the collector connected adjacent the speaker 28 and a transistor wired as in FIGURE 6 would be used in place of diode 24, again with its collector connected adjacent speaker 30. As an alternative, the transistor shown in either FIGURES 5 or 6 may be used in both channel leads 100 and 102 by merely reversing one transistor in one of the channel leads. These transistors would be chosen from the many commercially available to handle the specific power and frequency range required.

Figure 9:
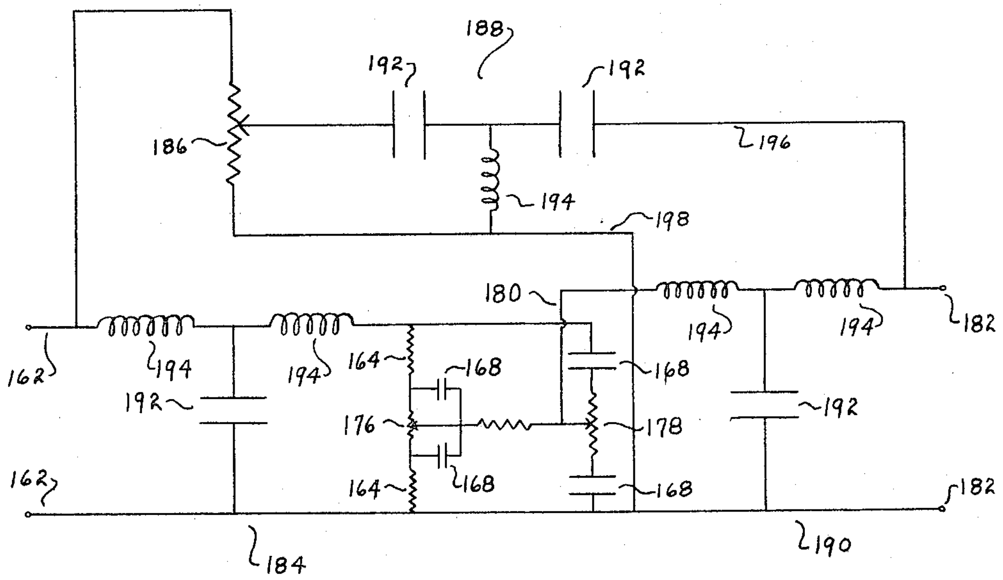
FIGURE 9 is a schematic view of the circuit of the blend control shown connected with the tone controls of a conventional amplifier.

On amplifiers with tone controls, it is possible to reduce the high frequencies by turning the treble control. This would of course at the same time reduce the switching frequency signal, and might distort the sound produced by the speakers. To avoid this possibility, the bypass shown in FIGURE 9 may be put into the amplifier circuit. In the ordinary tone control circuit, the signal enters the apparatus at 162, is separated into low and high frequencies by resistors 164 and capacitors 168, and are separately adjusted by potentiometers 176 and 178. The adjusted signals then leave the tone control stage of amplification by way of lead 180 and terminal 182. There are several modifications of this basic control circuit, many of them quite radical, but they all have the feature that the tone control stage may be isolated from the rest of the amplifier circuit.

In order that the switching frequency should not be reduced in the manner stated above, a bypass for that frequency around the tone control circuit may be included in the amplifier or added to the finished amplifier. This bypass consists of a low pass filter 184 for frequencies of below 25,000 cycles for example, variable reducing means 186, high pass filter 188 for frequencies of for example 25,000 and above, and a low pass filter 190. In operation, the signal enters at 162 and is separated into the low and high frequencies by filters 184 and 188, consisting of capacitors 192 and chokes 194. The actual frequency separating point can be adjusted by varying the values of the capacitors and coils, and in fact the apparatus may be arranged so that a band of frequencies which is designated as neither high nor low may be passed through or completely excluded from the two possible paths through this circuit.

The portion of the signal passed by filter 184 is varied by the tone controls in the usual manner, and is again passed by the low pass filter 190 to leave the tone control circuit. The high frequencies are adjusted to any desired level by variable reducing means 186 and are passed through high pass filter 188 to the circuit beyond low pass filter 190 by means of leads 196 and 198. Low pass filter 190 prevents the high frequency signal from entering the tone controls from that end and being modified by them.

Variable reducing means 186 is an important part of this circuit. If it is set so that it will not affect the high frequency signal at all, the signals A and B will appear in the speakers completely separated in the manner described above. However, if it is adjusted to reduce the high frequencies, and thus the switching frequency, a small amount of signal A will be reproduced in speaker 30 and a small amount of B in speaker 28 along with their proper signals. Thus, the "hole-in-the-middle" effect may be eliminated without the use of a third speaker. Furthermore, it may be desired to change a stereophonic signal into a monophonic one without changing the circuits, as might be done when comparing the relative effects of stereophonic and monophonic sound. This may be accomplished by reducing the high frequency signal as much as possible through variable reducing means 186. Thus, a continuous stereophonic signal blend control is achieved with this apparatus.

The present invention may also be used to make compatible stereophonic recordings, i.e., stereophonic disc and tape recordings which may be played on a conventional monophonic reproducing machine without any special apparatus to produce high quality monophonic sound. These recordings would be produced as suggested earlier by the use of the switching circuit and conventional recording apparatus and would be played back stereophonically by employing a conventional monophonic pickup and amplifier in combination with the speaker system of the present invention. Thus, the switched signals would be recorded on the disc or tape, and when played back would be picked up and amplified in the ordinary manner. Then the switched amplified signal would be separated by diodes or transistors 24 and 26 and reproduced by speakers 28 and 30.

Although only one basic design with a few modifications has been described in detail herein, various changes and other modifications may be made without departing from the scope of the present invention.

I claim:

1. In a transmission and reproduction apparatus for audio signals: a stereophonic pickup having a first channel and a second channel, a tube having a grid connected to one of said channels and another grid connected to the other of said channels, a cathode and plate for said first channel grid, a cathode and plate for said second channel grid, switcher means for alternately charging one cathode and then the other at a predetermined number of cycles per second intermittently and alternately creating pulses from one plate and then the other of different potential ranges, a capacitor, lead connecting said plates to said capacitor, an amplifier having an output, a lead connecting said capacitor to said amplifier, the current entering the amplifier flowing in one direction corresponding to the signal from one channel and the current flowing in the other direction corresponding to the signal from the other channel, three speakers, separate leads connecting two of said speakers to said output, a diode in the lead to one of said speakers passing the current corresponding to the signal of one channel in only one direction, a diode in the lead to another of said speakers passing the current corresponding to the signal of the other channel in the direction opposite to said first mentioned diode, and a lead connecting said output with said third speaker passing the current to said third speaker in both directions.

2. In a transmission and reproduction apparatus for audio signals: a stereophonic pickup having a left channel and a right channel, a potentiometer for said left channel, a potentiometer for said right channel, a tube having a grid for said left channel, a grid for said right channel, a cathode and plate for said left channel grid, a cathode and plate for said right channel grid, switcher means for alternately charging one cathode and then the other at a predetermined number of cycles per second intermittently and alternately creating pulses from one plate and then the other of different potential ranges, a capacitor, leads connecting said plates to said capacitor, an amplifier having an output, a lead connecting said capacitor to said amplifier, the current entering the amplifier flowing in one direction corresponding to the signal from said left channel and the current flowing in the other direction corresponding to the signal from the said right channel, three speakers, separate leads connecting two of said speakers with said output, a diode in the lead to one of said speakers passing the current corresponding to the signal of said left channel in only one direction, a diode in the lead to another of said speakers passing the current corresponding to the signal of said right channel in the direction opposite to said first mentioned diode, and a lead connecting said output with said third speaker passing the current to said third speaker in both directions.

3. In a transmission and reproduction apparatus for audio signals: a stereophonic pickup having a first channel and a second channel, a grid connected to one of said channels and another grid connected to the other of said channels, a cathode and plate for said first channel grid, a cathode and plate for said second channel grid, switcher means for alternately charging one cathode and then the other at a predetermined number of cycles per second intermittently and alternately creating pulses from one plate and then the other of different potential ranges, a capacitor, leads connecting said plates to said capacitor, three speakers, separate leads connecting two of said speakers with said capacitor, a diode in the lead to one of said speakers passing the current corresponding to the signal of one channel in only one direction, a diode in the lead to another of said speakers passing the current corresponding to the signal of the other channel in the direction opposite to said first mentioned diode, and a lead connecting said capacitor with said third speaker passing the current to said third speaker in both directions.

4. In a transmission and reproduction apparatus for audio signals: a stereophonic pickup having a first channel and a second channel, a means for creating a current alternately in response to the signal from one channel and then from the other channel so that the current flowing in one direction corresponds to the signal from one channel and the current flowing in the other direction corresponds to the signal from the other channel, an amplifier having an output, a lead connecting said means to said amplifier, three speakers, separate leads connecting two of said speakers with said output, a diode in the lead to one of said speakers passing the current corresponding to the signal of one channel in only one direction, a diode in the lead to another of said speakers passing the current corresponding to the signal of the other channel in the direction opposite to said first mentioned diode, and a lead connecting said output with said third speaker passing the current to said third speaker in both directions.

5. In a transmission and reproduction apparatus for audio signals: a pickup having a first channel and a second channel, a means having an output for creating a current alternately in response to the signal from one channel and then from the other channel so that the current flowing in one direction corresponds to the signal from one channel and the current flowing in the other direction corresponds to the signal from the other channel, three speakers, separate leads connecting two of said speakers with said output, a diode in the lead to one of said speakers passing the current corresponding to the signal of one channel in only one direction, a diode in the lead to another of said speakers passing the current corresponding to the signal of the other channel in the direction opposite to said first mentioned diode, and a lead connecting said output with said third speaker passing the current to said third speaker in both directions.

References Cited by the Examiner

UNITED STATES PATENTS

| | | | |
|---|---|---|---|
| 2,336,276 | 12/1943 | Van Der Meulen | 179—100.3 |
| 2,585,078 | 2/1952 | Barney | 307—88.5 |
| 2,792,447 | 5/1957 | Bottini | 179—100.1 |
| 2,876,366 | 3/1959 | Hussey | 307—88.5 |

OTHER REFERENCES

Shottenfield: "The 'Stereo Plus' System," Audio, October 1959.

Mason and Zimmerman: "Electronic Circuits, Signals, and Systems," Wiley, New York, 1960, pp. 222–227, 281–282, 535–538.

Joyce and Clarke: "Transistor Circuit Analysis," Addison Wesley, Reading, Mass., 1961, Library of Congress, pp. 308–323.

DAVID G. REDINBAUGH, *Primary Examiner.*

STEPHEN W. CAPELLI, BERNARD KONICK, *Examiners.*

E. M. RONEY, R. MURRAY, J. McHUGH, *Assistant Examiners.*